US012679339B2

(12) United States Patent
Mackenzie et al.

(10) Patent No.: US 12,679,339 B2
(45) Date of Patent: Jul. 14, 2026

(54) PARKING METHOD, APPARATUS AND SYSTEM

(71) Applicant: HYUNDAI MOBIS CO., LTD., Seoul (KR)

(72) Inventors: Douglas Mackenzie, Plymouth, MI (US); Venkatesh Dudiki, Plymouth, MI (US); Zhe Li, Plymouth, MI (US)

(73) Assignee: Hyundai Mobis Co., Ltd., Seoul (KR)

( * ) Notice: Subject to any disclaimer, the term of this patent is extended or adjusted under 35 U.S.C. 154(b) by 328 days.

(21) Appl. No.: 17/878,530

(22) Filed: Aug. 1, 2022

(65) Prior Publication Data

US 2024/0034304 A1    Feb. 1, 2024

(51) Int. Cl.
*B60W 30/06* (2006.01)
*B60W 50/14* (2020.01)

(52) U.S. Cl.
CPC ............ *B60W 30/06* (2013.01); *B60W 50/14* (2013.01); *B60W 2300/14* (2013.01); *B60W 2520/06* (2013.01); *B60W 2520/22* (2013.01); *B60W 2540/215* (2020.02)

(58) Field of Classification Search
CPC .. B60W 30/06; B60W 50/14; B60W 2300/14;
B60W 2520/06; B60W 2520/22; B60W
2540/215; B60W 30/10; B60W 40/10;
B60W 60/001; B60W 2050/0005; G01C
21/34; B60Y 2200/147
See application file for complete search history.

(56) References Cited

U.S. PATENT DOCUMENTS

| | | | |
|---|---|---|---|
| 2016/0068158 A1* | 3/2016 | Elwart .................. | B60W 30/06 701/1 |
| 2019/0227568 A1* | 7/2019 | Altinger ............ | G01C 21/3415 |
| 2020/0406888 A1* | 12/2020 | Hamai .................. | B60W 10/20 |
| 2021/0347410 A1* | 11/2021 | Niewiadomski .......... | B60R 1/26 |
| 2022/0009547 A1* | 1/2022 | Osajima ............... | B62D 5/0463 |

* cited by examiner

*Primary Examiner* — Thomas E Worden
*Assistant Examiner* — Elizabeth Rose Neleski
(74) *Attorney, Agent, or Firm* — NSIP Law

(57) ABSTRACT

A parking method includes searching a moving path of a trailer, giving a movement instruction to a vehicle, based on the moving path of the trailer, measuring one or both of a current location of the trailer and a current direction of the trailer according to the movement instruction, comparing one or both of a desired location of the trailer and a desired direction of the trailer in the moving path of the trailer with one or both of the current location of the trailer and the current direction of the trailer; and moving the trailer to a parking space, based on a result of the comparing.

12 Claims, 14 Drawing Sheets

210

220

230

PARKING METHOD, APPARATUS AND SYSTEM

TECHNICAL FIELD

The present disclosure relates to a parking method, apparatus, and system and, more particularly, to, a parking method, apparatus, and system for recording a parking process of a trailer and autonomously parking the trailer according to the recorded record.

BACKGROUND

The content described in this section merely provides the background information on the present disclosure and does not constitute the prior art.

In order to increase the safety and convenience of a driver using a vehicle, the development of technologies for grafting various sensors and electronic devices onto the vehicle is accelerating. This facilitates autonomous driving in which a vehicle can travel on a road by itself without a driver's intervention.

Meanwhile, interest in autonomous parking that automatically performs parking is also increasing, because many drivers have difficulty in parking even in autonomous driving.

Since a conventional autonomous parking system performs turning control using only steering, the radius of turn is large and thereby autonomous parking is possible only in a wide parking space. In particular, since the autonomous parking of a trailer requires a larger radius of turn, autonomous parking is difficult.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In view of the above, the present disclosure can autonomously park a trailer.

Furthermore, according to an embodiment, it is possible to record the parking process of the trailer.

Furthermore, according to an embodiment, it is possible to record a process in which the trailer leaves a parking place.

Furthermore, according to an embodiment, it is possible to calculate and store the location and direction of the trailer.

Furthermore, according to an embodiment, it is possible to add a new location and direction of the trailer to a previously stored record.

Furthermore, according to an embodiment, it is possible to autonomously park the trailer by comparing the stored location and direction of the trailer with the current location and direction of the trailer.

The problems to be solved by the present disclosure are not limited to the above-mentioned problems, and other problems which are not mentioned will be clearly understood by those skilled in the art from the following description.

In one general aspect, a parking method includes searching a moving path of a trailer, giving a movement instruction to a vehicle, based on the moving path of the trailer, measuring one or both of a current location of the trailer and a current direction of the trailer according to the movement instruction, comparing one or both of a desired location of the trailer and a desired direction of the trailer in the moving path of the trailer with one or both of the current location of the trailer and the current direction of the trailer; and moving the trailer to a parking space, based on a result of the comparing.

Searching the moving path of the trailer may include searching for the moving path of the trailer based on a name that is input by a driver.

Moving the trailer to the parking space may include moving the trailer to the parking space by minimizing one or both of a difference between the desired location of the trailer in the moving path of the trailer and the current location of the trailer and a difference between the desired direction of the trailer in the moving path of the trailer and the current direction of the trailer.

Measuring one or both of the current location of the trailer and the current direction of the trailer may include measuring one or both of the current location of the trailer and the current direction of the trailer based on a location of the vehicle, a direction of the vehicle, and an angle of a hitch.

The moving path of the trailer may be recorded or stored while the trailer is parked, or may be recorded or stored while the trailer is taken out of the parking space.

The moving path of the trailer may include a new location of the trailer, based on a distance between an initial location of the trailer and the current location of the trailer exceeding a first threshold.

The initial location of the trailer may be set to another location, based on a location and direction record count of the trailer exceeding a third threshold.

The moving path of the trailer may include a new direction of the trailer, based on a direction between an initial direction of the trailer and the current direction of the trailer exceeding a second threshold.

The initial direction of the trailer may be set to another direction, based on a location and direction record count of the trailer exceeding a third threshold.

The moving path of the trailer may correspond to a last section in a process in which the trailer is parked, or may correspond to a first section in a process in which the trailer is taken out of the parking space.

In another general aspect, a parking system includes a memory and a plurality of processors, wherein at least one of the processors is configured to search a moving path of a trailer, give a movement instruction to a vehicle, based on the moving path of the trailer, measure one or both of a current location of the trailer and a current direction of the trailer according to the movement instruction, compare one or both of a desired location of the trailer and a desired direction of the trailer in the moving path of the trailer with one or both of the current location of the trailer and the current direction of the trailer, and move the trailer to a parking space, based on a comparison result.

The at least one processor may be configured to search the moving path of the trailer based on a name that is input by a driver.

The at least one processor may be configured to move the trailer to the parking space by minimizing one or both of a difference between the desired location of the trailer in the moving path of the trailer and the current location of the trailer and a difference between the desired direction of the trailer in the moving path of the trailer and the current direction of the trailer.

The at least one processor may be configured to measure one or both of the current location of the trailer and the current direction of the trailer based on a location of the vehicle, a direction of the vehicle, and an angle of a hitch.

According to an embodiment, it is advantageous in that it is possible to autonomously park a trailer.

Furthermore, according to an embodiment, it is advantageous in that it is possible to record the parking process of the trailer.

Furthermore, according to an embodiment, it is advantageous in that it is possible to record a process in which the trailer leaves a parking place.

Furthermore, according to an embodiment, it is advantageous in that it is possible to calculate and store the location and direction of the trailer.

Furthermore, according to an embodiment, it is advantageous in that it is possible to add a new location and direction of the trailer to a previously stored record.

Furthermore, according to an embodiment, it is advantageous in that it is possible to autonomously park the trailer by comparing the stored location and direction of the trailer with the current location and direction of the trailer.

Effects achieved by the present disclosure are not limited to the above-mentioned effects, and other effects which are not mentioned will be clearly understood by those skilled in the art from the following description.

Other features and aspects will be apparent from the following detailed description, the drawings, and the claims.

4

Figure 14:
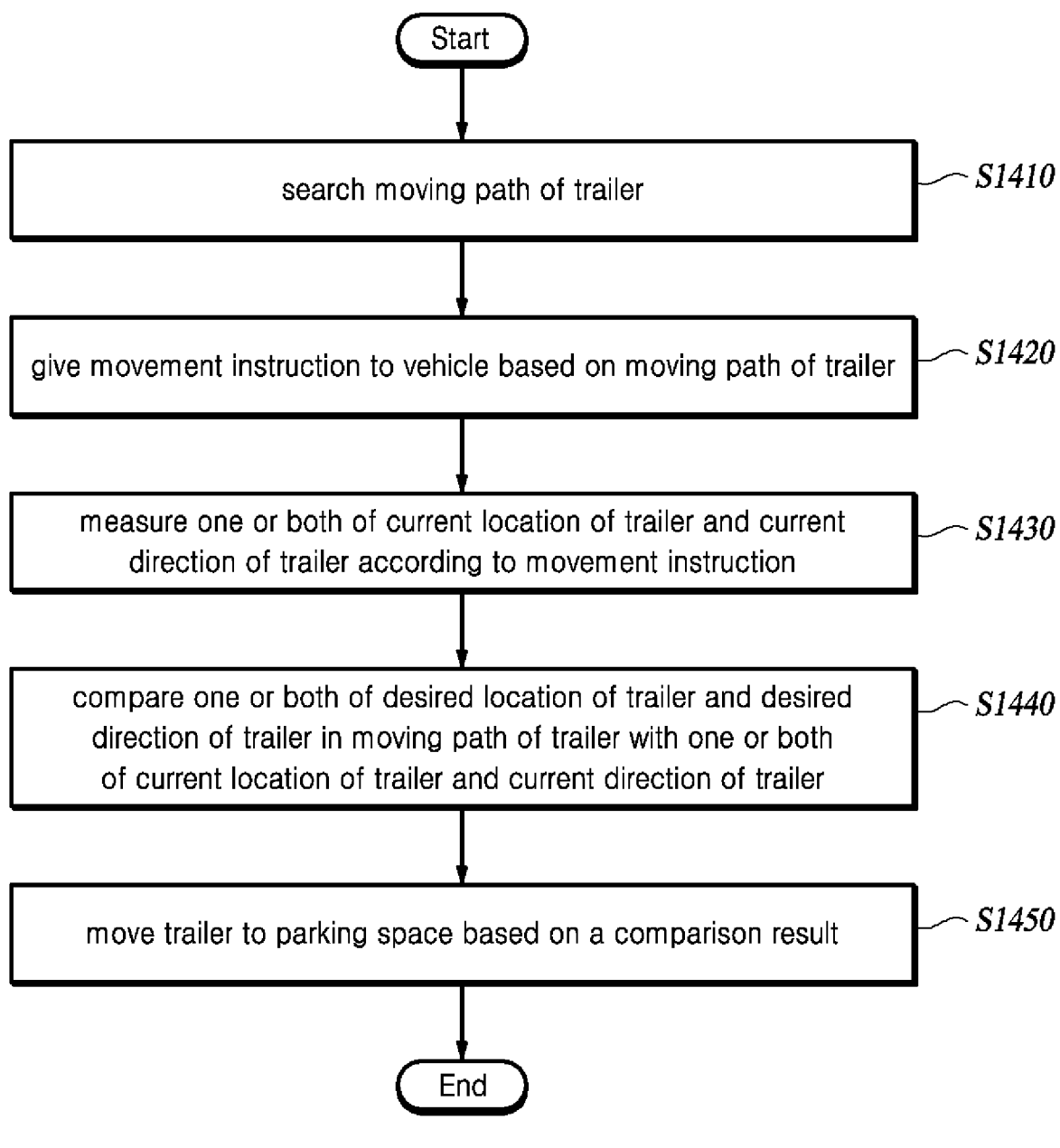

FIG. 14 is a diagram illustrating a process where a parking system automatically parks the trailer according to an embodiment of the present disclosure.

DETAILED DESCRIPTION

Figure 1:
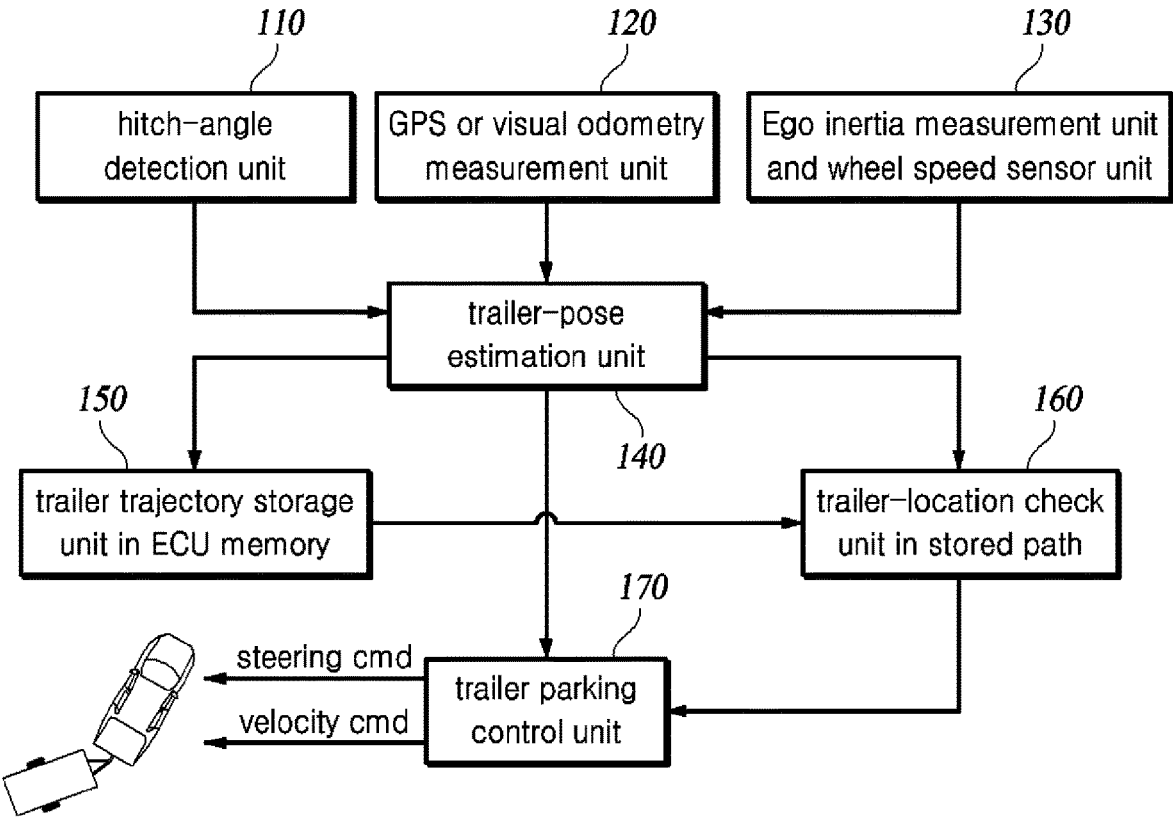
FIG. 1 is a block diagram illustrating the configuration of a parking system according to an embodiment of the present disclosure.

FIG. 1 is a block diagram illustrating the configuration of a parking system according to an embodiment of the present disclosure. The parking system according to the present disclosure may be a system that automates the process of parking a trailer. If a driver starts taking the trailer out of a trailer parking location, the parking system may record and store the location of the trailer and a trajectory along which the trailer travels. If the driver starts parking the trailer, the parking system may record and store the location of the trailer and the trajectory along which the trailer travels. Subsequently, in the case that the driver desires to park the trailer in a parking location again, the parking system may recognize the approach of the trailer to the stored trajectory, and may suggest the driver to automatically park the trailer. If the driver activates an automatic parking function, the parking system may cause the vehicle to tow the trailer according to the stored trajectory so that the trailer reaches the parking location. When the trailer arrives at the parking location, the parking system may stop the vehicle and the trailer and may give the driver right to control.

Referring to FIG. 1, the parking system according to the present disclosure may include a hitch-angle detection unit 110, a GPS or visual odometry measurement unit 120, an Ego inertia measurement unit and a wheel speed sensor unit 130, a trailer-pose estimation unit 140, a trailer trajectory storage unit 150 in an ECU (Electric Control Unit) memory, a trailer-location check unit 160 in a stored path, and a trailer parking control unit 170. The hitch-angle detection unit 110 may detect the angle of a hitch connecting a vehicle and a trailer. The GPS or visual odometry measurement unit 120 may indicate the location of the vehicle, and may measure the visual odometry of the vehicle. The Ego inertia measurement unit and the wheel speed sensor unit 130 may measure the inertia of a host vehicle and may sense a speed. The trailer-pose estimation unit 140 may estimate the location and direction of the trailer. The trailer trajectory storage unit 150 in the ECU memory may store a movement trajectory while the trailer is parked or a movement trajectory while the trailer leaves a parking space, in the ECU memory. The trailer-location check unit 160 in the stored path may check where the trailer is located in the stored path or trajectory of the trailer. The trailer parking control unit 170 may compare the current location and direction of the trailer with the stored path, and may inform a user that a trailer automatic parking mode is available. The trailer parking control unit 170 may execute the automatic parking mode, and may give a steering instruction and a velocity instruction to the vehicle.

Figure 2:
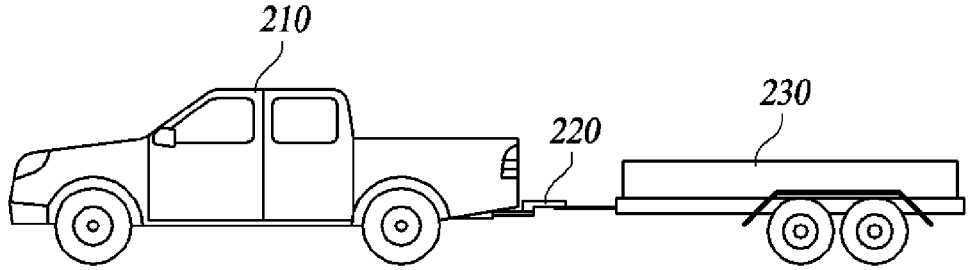
FIG. 2 is a diagram illustrating a hitch between a vehicle and a trailer according to an embodiment of the present disclosure.

FIG. 2 is a diagram illustrating the hitch between the vehicle and the trailer according to an embodiment of the present disclosure.

Referring to FIG. 2, the vehicle 210 and the trailer 230 may be connected via the hitch 220. The vehicle 210 may include one or more sensors that measure the locations and directions of the trailer parking control unit and the vehicle, and one or more sensors that measure the hitch angle between the vehicle and the trailer. The vehicle 210 may tow or park the trailer 230 through the hitch 220.

Figure 3:
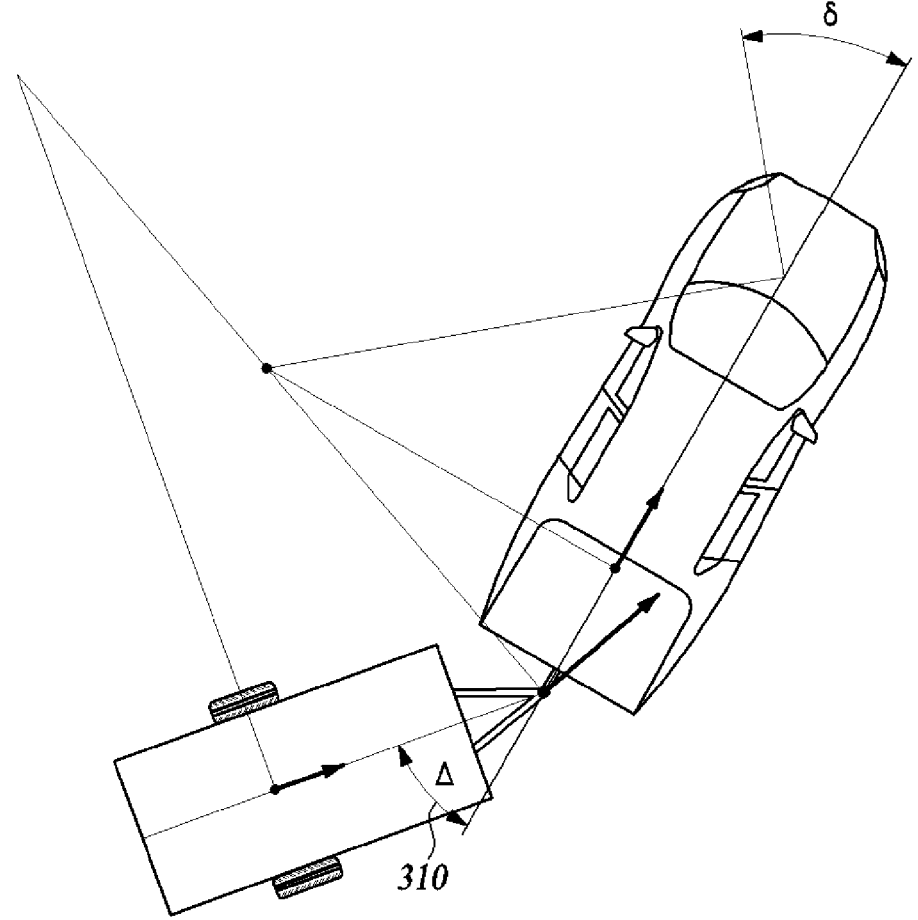
FIG. 3 is a diagram illustrating a hitch angle according to an embodiment of the present disclosure.

FIG. 3 is a diagram illustrating the hitch angle according to an embodiment of the present disclosure.

Referring to FIG. 3, the hitch angle 310 may correspond to an angle between a straight line passing through the center of the vehicle and a straight line passing through the center of the trailer. The hitch angle 310 may be measured by one or more sensors included in the vehicle. The location and direction of the trailer may be calculated using the hitch angle 310.

Figure 4:
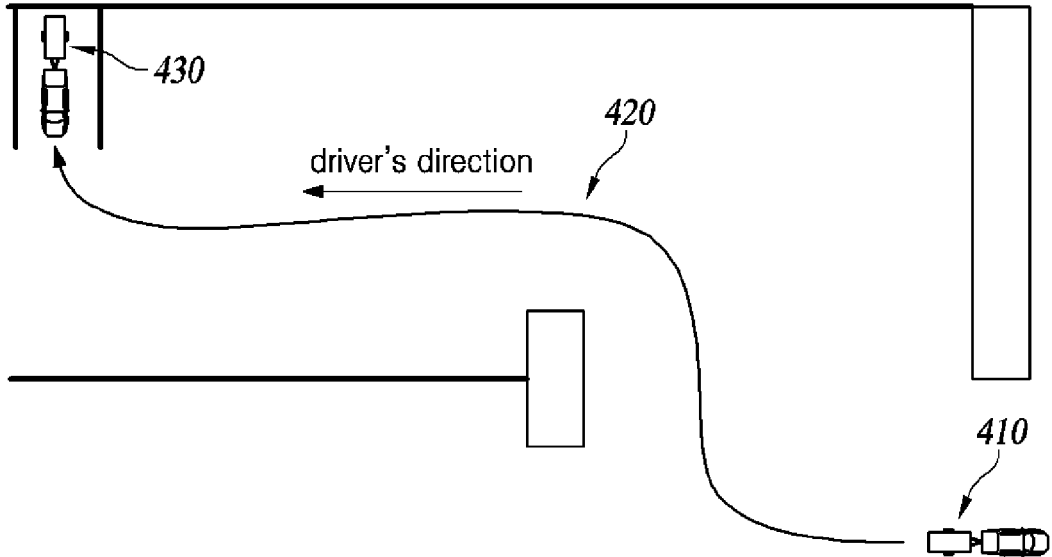
FIG. 4 is a diagram illustrating a parking path of the trailer according to an embodiment of the present disclosure.

FIG. 4 is a diagram illustrating the parking path of the trailer according to an embodiment of the present disclosure. When the driver parks the trailer, a recording mode may be manually activated. The recording mode may correspond to a mode for recording the process of parking the trailer. The driver may activate the recording mode, and may move the trailer to the parking space.

Referring to FIG. 4, the driver may activate the recording mode at a trailer location 410 where parking is started. The driver may move the trailer in reverse according to the parking path 420. The driver may finish the recording mode at a trailer location 430 where parking is ended. The parking path 420 may be recorded and stored.

Figure 5:
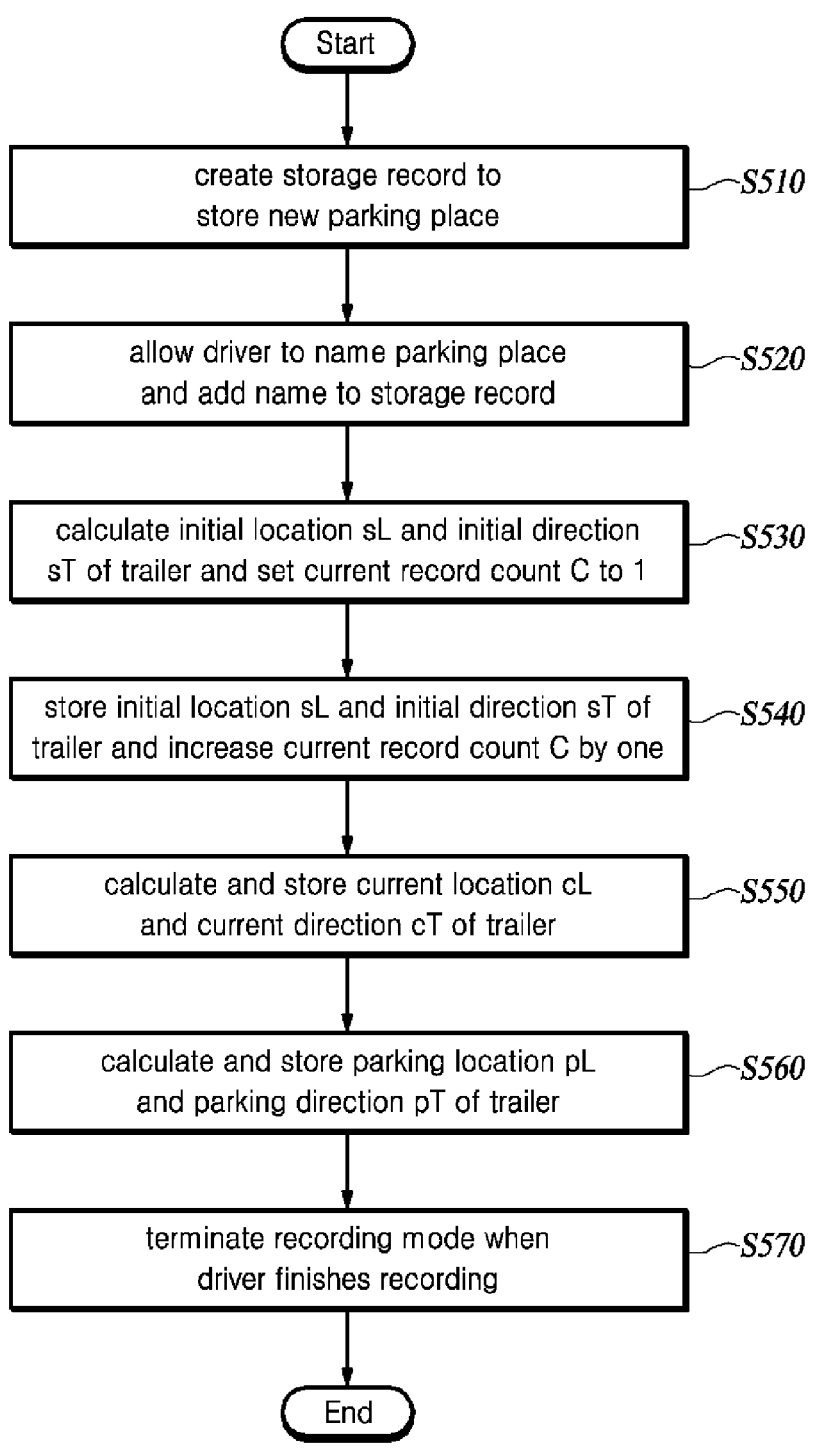
FIG. 5 is a diagram illustrating the process of recording the parking of the trailer according to an embodiment of the present disclosure.

FIG. 5 is a diagram illustrating the process of recording the parking of the trailer according to an embodiment of the present disclosure.

Referring to FIG. 5, when the driver starts parking the trailer, the recording mode may be activated. A storage record may be created to store a new parking place (S510). The new parking place may be stored in a non-volatile memory. The parking system may allow the driver to name the parking place, and may add that name to the storage record (S520). The initial location sL of the trailer and the initial direction sT of the trailer may be calculated, and a current record count C may be set to 1 (S530). While the recording mode is activated, the parking system may measure the location and direction of the trailer using the measured location and direction of the vehicle and the measured hitch angle. The location and direction of the trailer may correspond to a trailer pose. The initial location sL of the trailer and the initial direction sT of the trailer may be stored, and the current record count C may be increased by one (S540). The current location cL and the current direction cT of the trailer may be calculated and stored (S550). While the trailer moves to the parking space, a series of trailer-pose records may be written and stored in the non-volatile memory. Thus, a moving path that is the trajectory of the trailer may be stored. The parking location pL and the parking direction pT of the trailer may be calculated and stored (S560). When the driver finishes the recording, the recording mode may be terminated (S570).

Only the last portion of the path of the trailer stored in the non-volatile memory may be stored. For instance, when the driver activates the recording mode at a long distance from the parking space and the trailer has the moving path of 100 meters, only the last 30 meters of the moving path of the trailer may be stored. The driver may finish parking, and may send a parking completion signal to the parking system. The parking system may receive the parking completion signal, and may finish copying and storing a final trailer-pose record in the non-volatile memory. The recording mode may be terminated.

Figure 6:
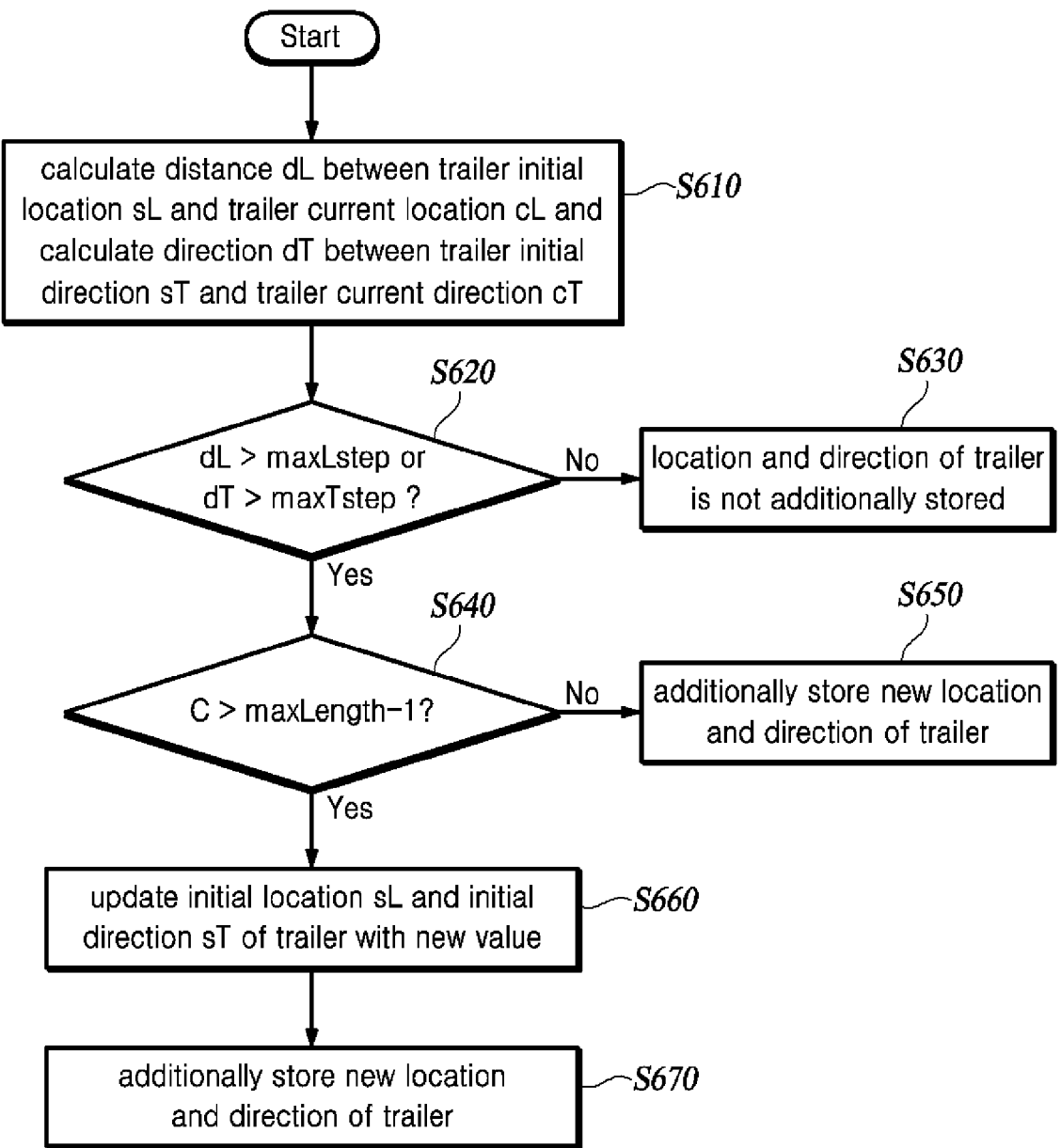
FIG. 6 is a diagram illustrating the process of storing the location and direction of a new trailer in the process of recording the parking of the trailer according to an embodiment of the present disclosure.

FIG. 6 is a diagram illustrating the process of storing the location and direction of the new trailer in the process of recording the parking of the trailer according to an embodiment of the present disclosure. A new trailer-pose record may be added to the previously stored moving path of the trailer. When the trailer moves a distance more than maxLstep or turns more than maxTstep compared to the most recent record written in the non-volatile memory, a new trailer-pose record may be added.

Referring to FIG. 6, a distance dL between the trailer initial location sL and the trailer current location cL may be calculated, and a direction dT between the trailer initial direction sT and the trailer current direction cT may be calculated (S610). It may be determined whether dL is larger than maxLstep or dT is larger than maxTstep (S620). When dL is smaller than maxLstep and dT is smaller than maxTstep (S620-NO), the location and the direction of the trailer may not be additionally stored (S630). When dL is larger than maxLstep or dT is larger than maxTstep (S620-YES), it may be determined whether the current record count C is larger than maxLength-1 (S640). There may be a limit to maximum count of trailer-pose records that may be stored in the non-volatile memory. The maximum count of trailer-pose records that may be stored may correspond to maxLength. When each trailer-pose record is stored, it may be checked whether the current record count C exceeds maxLength. When the current record count C is smaller than maxLength-1 (S640-NO), the new location and direction of the trailer may be additionally stored (S650). When the current record count C is larger than maxLength-1 (S640-YES), the initial location sL and the initial direction sT of the trailer may be updated with a new value (S660). In this case, the oldest trailer-pose record may be discarded. The initial location sL and the initial direction sT of the trailer may be updated with the oldest trailer-pose record remaining in the non-volatile memory. The new location and direction of the trailer may be further stored (S670).

The process of storing the new location and direction of the trailer in the process of recording the parking of the trailer, which has been described with reference to FIG. 6, is illustrative, and the process of storing the new location and direction of the trailer in the process of recording the parking of the trailer according to the present disclosure is not limited to the example shown in FIG. 6. For instance, some of the steps shown in FIG. 6 may be omitted, and steps other than the steps shown in FIG. 6 may be added to any location on the flowchart of FIG. 6. Further, some of the steps shown in FIG. 6 may be performed simultaneously with other steps, or the order of the steps may be changed.

Figure 7:
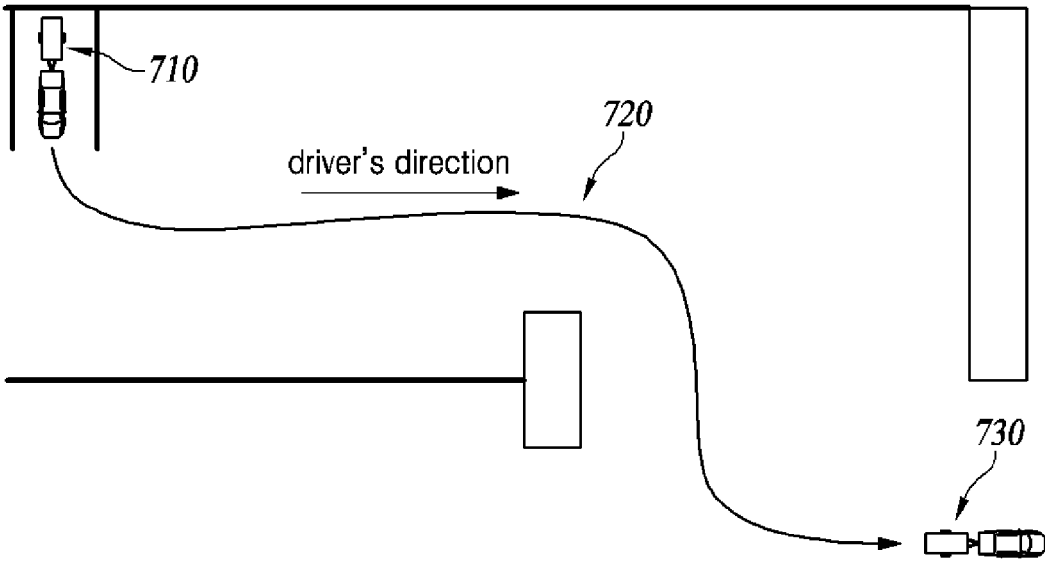
FIG. 7 is a diagram illustrating a path where the trailer leaves a parking space, according to an embodiment of the present disclosure.

FIG. 7 is a diagram illustrating a path where the trailer leaves the parking space, according to an embodiment of the present disclosure. When the driver takes the trailer out of the parking space, the recording mode may be manually activated. The recording mode may correspond to a mode for recording the process of taking the trailer out of the parking space. The driver may activate the recording mode, and may move the trailer by taking the trailer out of the parking space.

Referring to FIG. 7, the driver may activate the recording mode in the trailer location 710 that is in the parking space. The driver may move the trailer along the moving path 720. At the trailer location 730 where the process of taking the trailer out of the parking space is completed, the driver may complete the recording mode. The moving path 720 may be recorded and stored.

Figure 8:
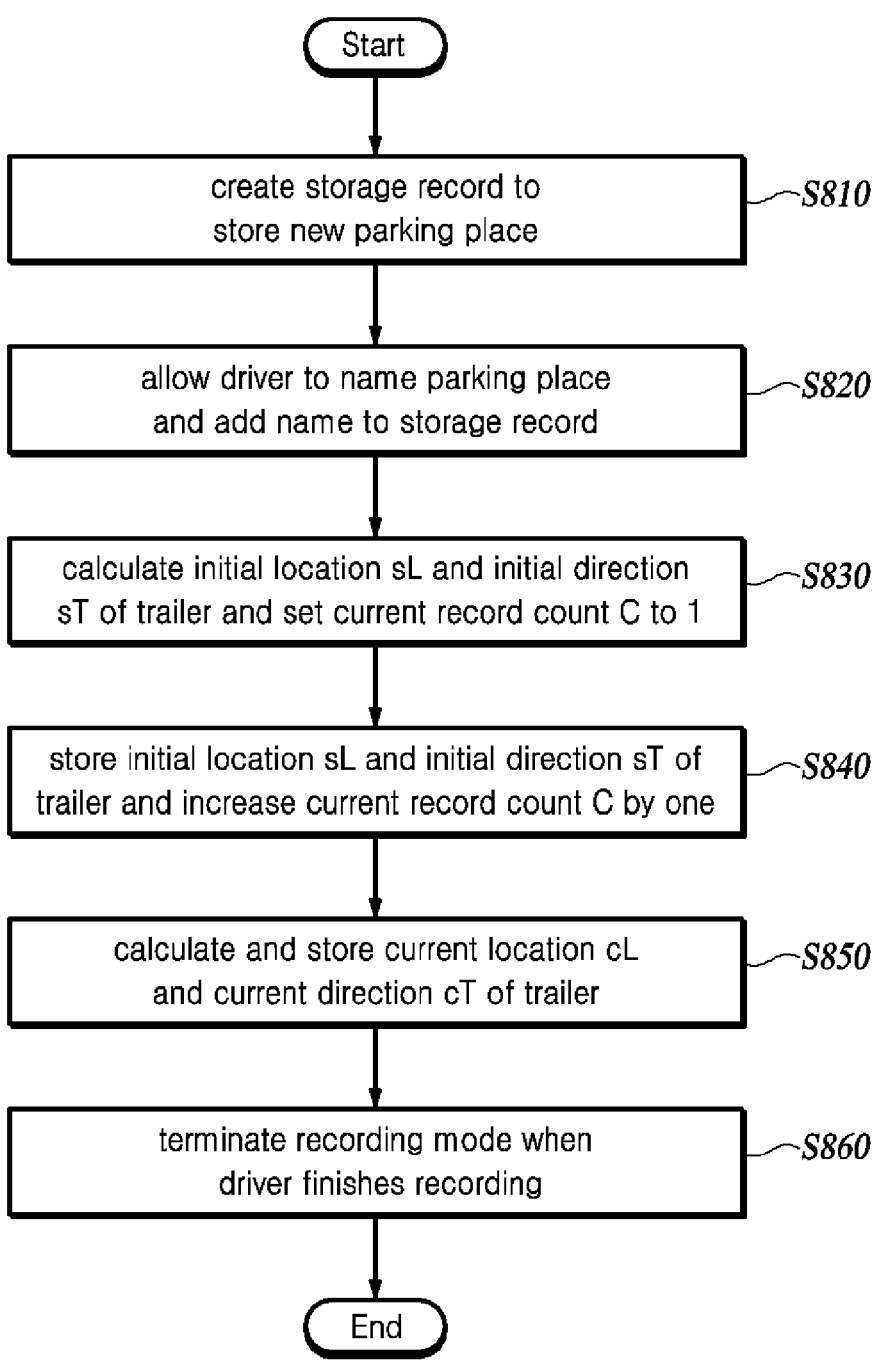
FIG. 8 is a diagram illustrating the process of recording the trailer leaving the parking space, according to an embodiment of the present disclosure.

FIG. 8 is a diagram illustrating the process of recording the trailer leaving the parking space, according to an embodiment of the present disclosure.

When the driver starts taking the trailer out of the parking space, the recording mode may be activated. In order to store a new parking place, a storage record may be created (S810). The new parking place may be stored in the non-volatile memory. The parking system may allow the driver to name the parking place, and may add that name to the storage record (S820). The initial location sL of the trailer and the initial direction sT of the trailer may be calculated, and a current record count C may be set to 1 (S830). While the recording mode is activated, the parking system may measure the location and direction of the trailer using the measured location and direction of the vehicle and the measured hitch angle. The location and direction of the trailer may correspond to a trailer pose. The initial location sL of the trailer and the initial direction sT of the trailer may be stored, and the current record count C may be increased by one (S840). The current location cL and the current direction cT of the trailer may be calculated and stored (S850). While the trailer moves out from the parking space, a series of trailer-pose records may be written and stored in the non-volatile memory. Thus, a moving path that is the trajectory of the trailer may be stored. When the driver finishes the recording, the recording mode may be terminated (S860).

Only the first portion of the path of the trailer stored in the non-volatile memory may be stored. For instance, when the driver starts taking the trailer out of the parking space, the recording mode is activated. When the trailer has the moving path of 100 meters, only the first 30 meters of the moving path of the trailer may be stored. The driver may completely take the trailer out of the parking space, and may send a completion signal to the parking system. The parking system may receive the completion signal, and may finish copying and storing a final trailer-pose record in the non-volatile memory. The recording mode may be terminated.

Figure 9:
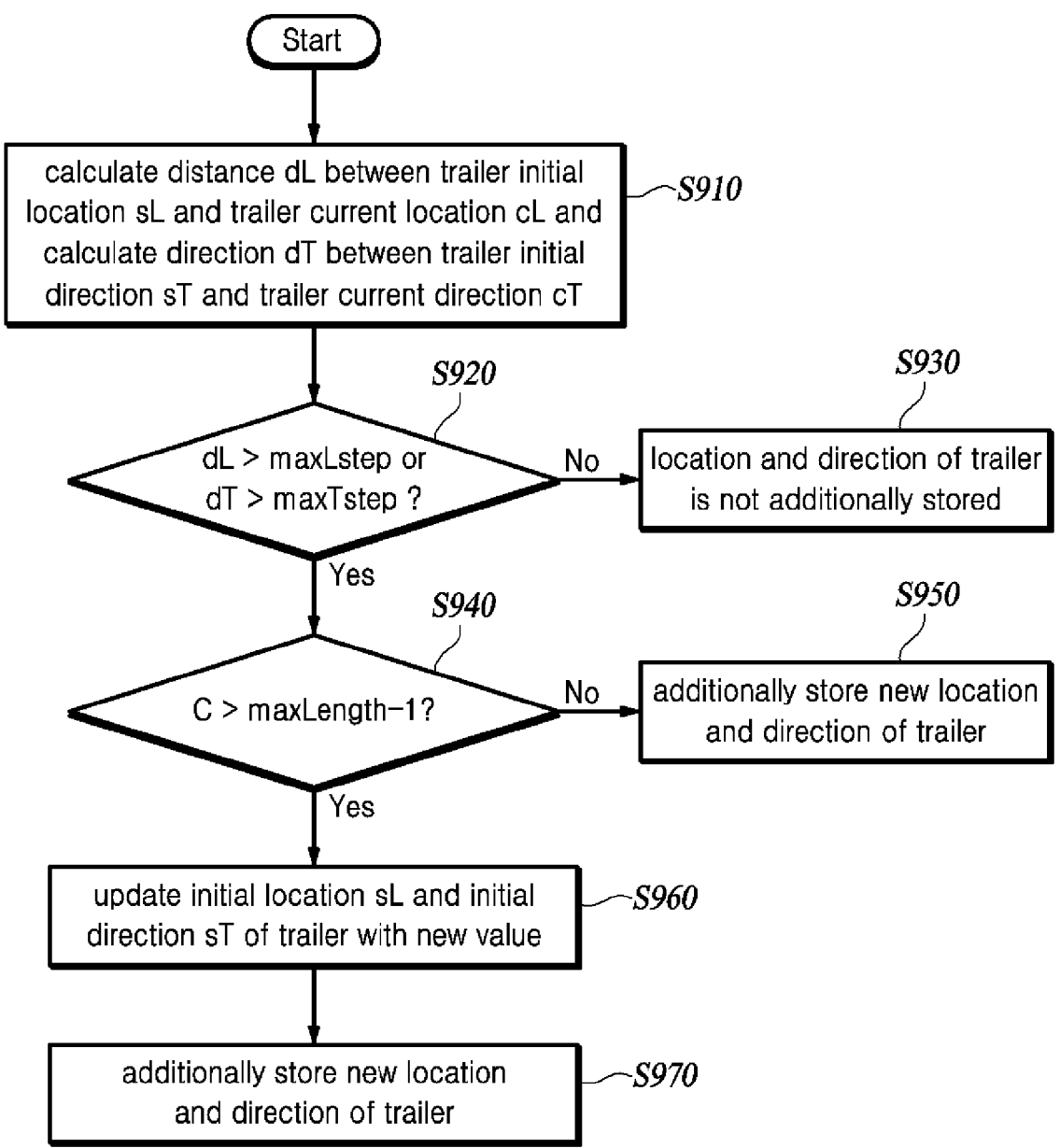
FIG. 9 is a diagram illustrating the process of storing the location and direction of a new trailer in the process of recording the trailer leaving the parking space, according to an embodiment of the present disclosure.

FIG. 9 is a diagram illustrating the process of storing the location and direction of the new trailer in the process of recording the trailer leaving the parking space, according to an embodiment of the present disclosure.

Referring to FIG. 9, a distance dL between the trailer initial location sL and the trailer current location cL may be calculated, and a direction dT between the trailer initial direction sT and the trailer current direction cT may be calculated (S910). It may be determined whether dL is larger than maxLstep or dT is larger than maxTstep (S920). When dL is smaller than maxLstep and dT is smaller than maxTstep (S920-NO), the location and the direction of the trailer may not be additionally stored (S930). When dL is larger than maxLstep or dT is larger than maxTstep (S920-YES), it may be determined whether the current record count C is larger than maxLength-1 (S940). There may be a limit to maximum count of trailer-pose records that may be stored in the non-volatile memory. The maximum count of trailer-pose records that may be stored may correspond to maxLength. When each trailer-pose record is stored, it may be checked whether the current record count C exceeds maxLength. When the current record count C is smaller than maxLength-1 (S940-NO), the new location and direction of the trailer may be additionally stored (S950). When the current record count C is larger than maxLength-1 (S940-YES), the initial location sL and the initial direction sT of the trailer may be updated with a new value (S960). In this case, the oldest trailer-pose record may be discarded. The initial location sL and the initial direction sT of the trailer may be updated with the oldest trailer-pose record remaining in the non-volatile memory. The new location and direction of the trailer may be further stored (S970).

The process of storing the new location and direction of the trailer in the process of recording the trailer leaving the parking space, which has been described with reference to FIG. 9, is illustrative, and the process of storing the new location and direction of the trailer in the process of recording the trailer leaving the parking space according to the present disclosure is not limited to the example shown in FIG. 9. For instance, some of the steps shown in FIG. 9 may be omitted, and steps other than the steps shown in FIG. 9 may be added to any location on the flowchart of FIG. 9. Further, some of the steps shown in FIG. 9 may be performed simultaneously with other steps, or the order of the steps may be changed.

Figure 10:
FIG. 10 is a diagram illustrating the path where the trailer leaves the parking space with a coordinate, according to an embodiment of the present disclosure.
Figure 10:
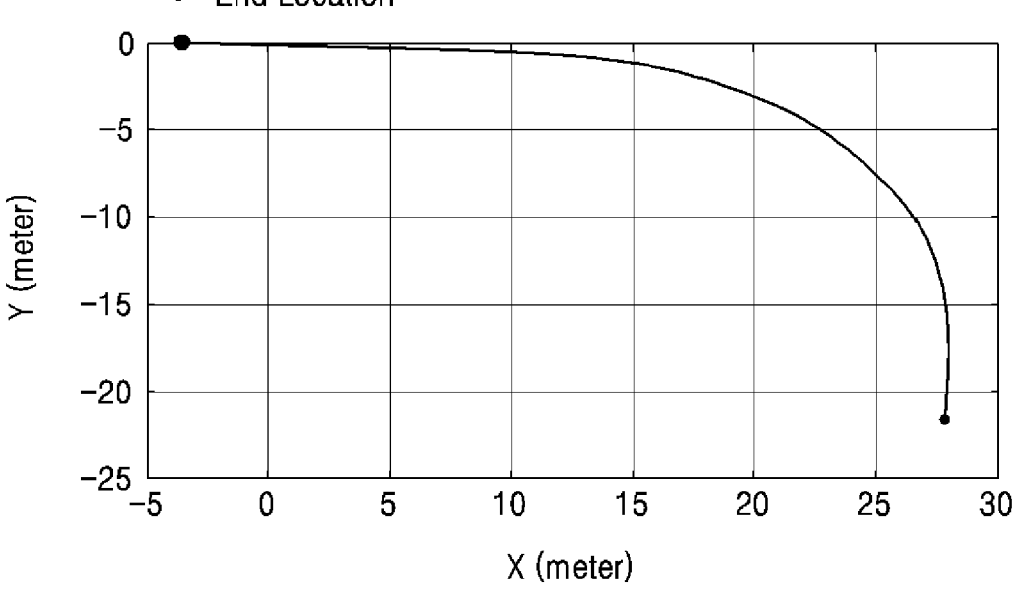

FIG. 10 is a diagram illustrating the path where the trailer leaves the parking space with a coordinate, according to an embodiment of the present disclosure.

Referring to FIG. 10, the driver may move the trailer from a parking location to an end location using the vehicle. At the parking location, the driver may activate the recording mode. The trailer may move from the parking location to the end location along a moving path of a parabolic shape. At the end location, the driver may terminate the recording mode. The moving path of the parabolic shape may be stored. The coordinate location and direction of the trailer in the moving path may be stored in the non-volatile memory.

Figure 11:
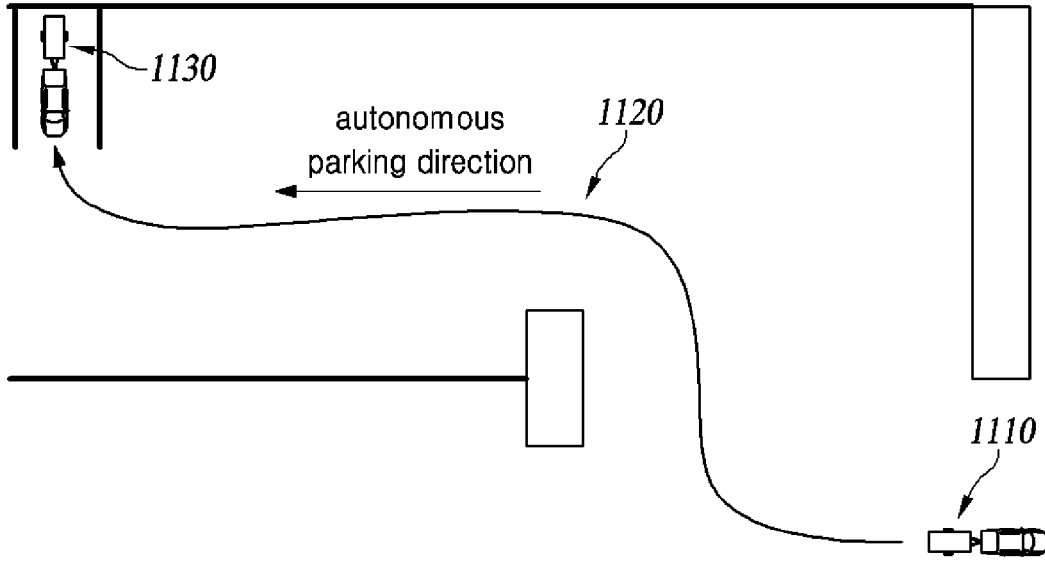
FIG. 11 is a diagram illustrating a path where the trailer is parked according to a parking mode, according to an embodiment of the present disclosure.

FIG. 11 is a diagram illustrating the path where the trailer is parked according to the parking mode, according to an embodiment of the present disclosure. The driver may operate the parking mode so as to park the trailer. If the parking mode is operated, the trailer may automatically move to the parking space. When the trailer arrives at the parking space, the parking mode may be terminated.

Referring to FIG. 11, automatic parking may be performed at a trailer location 1110 where the parking mode is started. According to the parking mode, the trailer may automatically move to a moving path 1120. The moving path 1120 may be the same as the moving path stored in the recording mode. The automatic parking may be terminated at a trailer location 1130 where the parking mode is ended.

Figure 12:
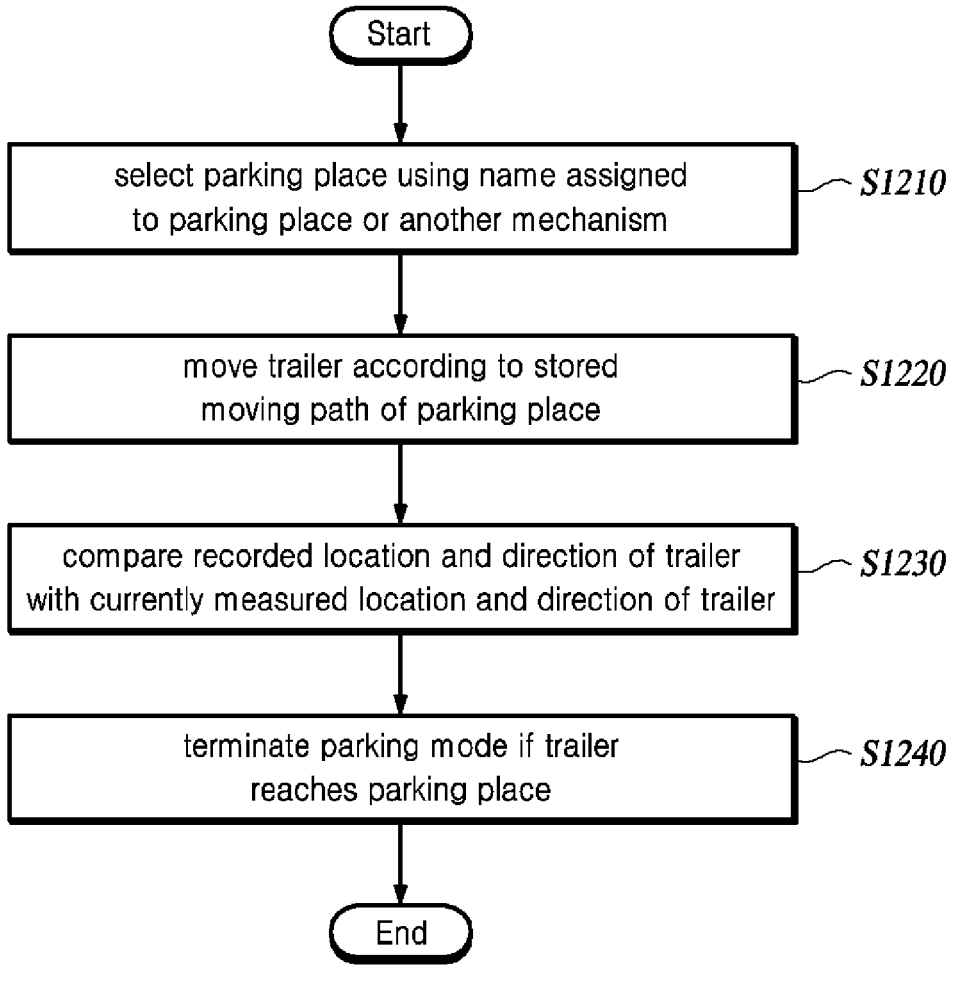
FIG. 12 is a diagram illustrating a parking mode process according to an embodiment of the present disclosure.

FIG. 12 is a diagram illustrating a parking mode process according to an embodiment of the present disclosure.

Referring to FIG. 12, the driver may activate the parking mode so as to automatically park the trailer. A parking place may be selected using a name assigned to a parking place or another mechanism (S1210). According to the stored moving path of the parking place, the trailer may move (S1220). The stored moving path may be tracked according to the recording mode by searching a name. The parking system may compare the recorded location and direction of the trailer with the currently measured location and direction of the trailer (S1230). While the parking mode is activated, the parking system may calculate the location and direction of the trailer using the measured location and direction of the vehicle and the angle of the hitch. The actually measured trailer location and angle may be continuously compared with the stored trailer location and angle in the moving path. This comparison may minimize difference between the actually measured trailer location and angle and the stored trailer location and angle in the moving path. If the trailer reaches the parking place, the parking mode may be terminated (S1240).

Figure 13:
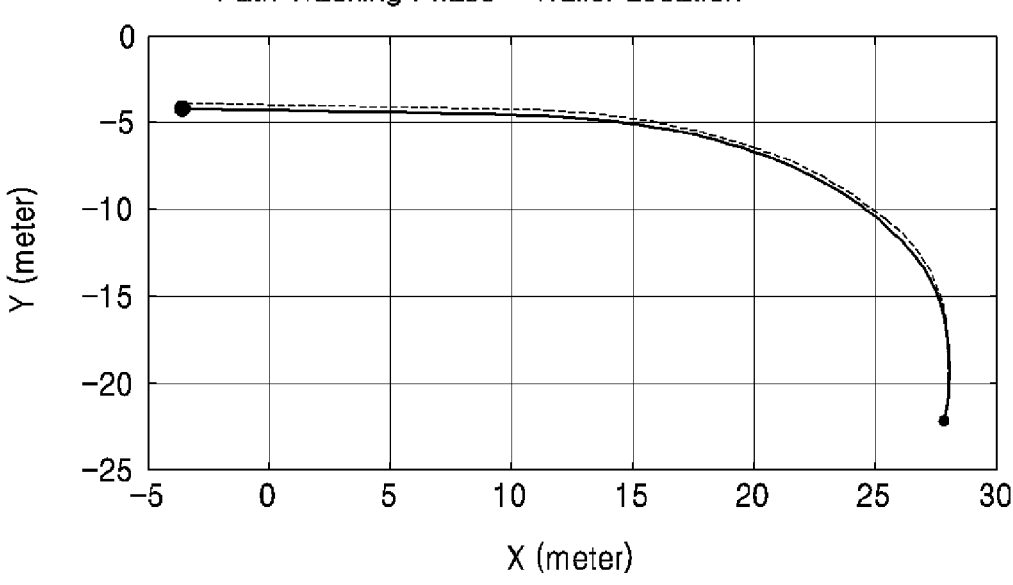
FIG. 13 is a diagram illustrating a path where the trailer is parked according to the parking mode with a coordinate, according to an embodiment of the present disclosure.

FIG. 13 is a diagram illustrating a path where the trailer is parked according to the parking mode with a coordinate, according to an embodiment of the present disclosure.

Referring to FIG. 13, the driver may activate the parking mode to automatically park the trailer. The trailer may move from a parking-mode start location to a parking-mode end location according to the stored moving path. The moving path may have the parabolic shape. There may be a slight difference between a path along which the trailer actually moves depending on the parking mode and a stored moving path.

FIG. 14 is a diagram illustrating a process where the parking system automatically parks the trailer according to an embodiment of the present disclosure.

Referring to FIG. 14, the moving path of the trailer may be searched (S1410). The moving path of the trailer may be searched based on the name that is input by the driver. A movement instruction may be given to the vehicle based on the moving path of the trailer (S1420). The moving path of the trailer may be a path that is recorded and stored while the trailer is parked, or a path that is recorded and stored while the trailer is taken out of the parking space. The moving path of the trailer may include a new location of the trailer, based on a distance between the initial location of the trailer and the current location of the trailer exceeding a first threshold. Here, the first threshold may correspond to maxLstep. The moving path of the trailer may include a new location of the trailer, based on a direction between the initial direction of the trailer and the current direction of the trailer exceeding a second threshold. Here, the second threshold may correspond to maxTstep. The moving path of the trailer may correspond to a last section in a process in which the trailer is parked, or may correspond to a first section in a process in which the trailer is taken out of the parking space. Based on a location and direction record count of the trailer exceeding a third threshold, the initial location of the trailer may be set to another location. The third threshold may correspond to maxLength-1. the initial location of the trailer may be set to the oldest different location value remaining in the non-volatile memory. Based on a location and direction record count of the trailer exceeding the third threshold, the initial direction of the trailer may be set to another direction. The third threshold may correspond to maxLength-1. The initial direction of the trailer may be set to the oldest different direction value remaining in the non-volatile memory.

One or both of the current location of the trailer and current direction of the trailer according to the movement instruction may be measured (S1430). Based on a location of the vehicle and a direction of the vehicle and the hitch's angle of the vehicle, at least one of both of the current location of the trailer and the current direction of the trailer may be measured. At least one or both of a desired location of the trailer and a desired direction of the trailer in the moving path of the trailer may be compared with one or both of the current location of the trailer and the current direction of the trailer (S1440). Based on a result of the comparing, the trailer may be moved to the parking space (S1450). One or both of a difference between the desired location of the trailer in the moving path of the trailer and the current location of the trailer and a difference between the desired direction of the trailer in the moving path of the trailer and the current direction of the trailer may be minimized, so that the trailer may be moved to the parking space.

Each component of the apparatus or method according to the present disclosure may be implemented as hardware or software, or a combination of hardware and software. Further, the function of each component may be implemented as software and a microprocessor may be implemented to execute the function of software corresponding to each component.

Various implementations of systems and techniques described herein may include a digital electronic circuit, an integrated circuit, a field programmable gate array (FPGA), an application specific integrated circuit (ASIC), computer hardware, firmware, software, and/or combination thereof may be realized. These various implementations may include an implementation where one or more computer programs are executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or code) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, and computer-readable codes may be stored and executed in a distributed manner.

The flowchart/timing diagram of the present specification describes processes as being sequentially executed, but this is merely illustrative of the technical idea of an embodiment of the present disclosure. In other words, since it is apparent to those skilled in the art that an order described in the flowchart/timing diagram may be changed or one or more processes may be executed in parallel without departing from the essential characteristics of an embodiment of the present disclosure, the flowchart/timing diagram is not limited to a time-series order.

What is claimed is:

1. A parking method comprising:
   searching a moving path of a trailer;
   giving a movement instruction to a vehicle, when the trailer approaches the moving path recorded in the non-volatile memory;
   measuring a current location of the trailer and a current direction of the trailer according to the movement instruction;
   comparing a desired location of the trailer and a desired direction of the trailer in the moving path of the trailer with the current location of the trailer and the current direction of the trailer; and
   moving the trailer to a parking space by minimizing a difference between the desired location of the trailer in the moving path of the trailer and the current location of the trailer and a difference between the desired direction of the trailer in the moving path of the trailer and the current direction of the trailer,
   wherein the moving path of the trailer is recorded or stored based on a trailer pose calculated using a hitch angle between the vehicle and the trailer, a location of the vehicle, and a direction of the vehicle while the trailer is parked or while the trailer is taken out of the parking space,
   wherein the moving path of the trailer comprises a new location of the trailer, based on a distance between an initial location of the trailer and the current location of the trailer exceeding a first threshold,
   wherein the initial location of the trailer is set to another location, based on a location record count of the trailer and a direction record count of the trailer exceeding a second threshold.

2. The parking method of claim 1, wherein searching the moving path of the trailer comprises searching for the moving path of the trailer based on a name that is input by a driver.

3. The parking method of claim 1, wherein measuring the current location of the trailer and the current direction of the trailer comprises measuring the current location of the trailer and the current direction of the trailer based on a location of the vehicle, a direction of the vehicle, and an angle of a hitch.

4. The parking method of claim 1, wherein the moving path of the trailer comprises a new direction of the trailer, based on a direction between an initial direction of the trailer and the current direction of the trailer exceeding a third threshold.

5. The parking method of claim 4, wherein the initial direction of the trailer is set to another direction, based on a location and direction record count of the trailer exceeding a fourth threshold.

6. The parking method of claim 1, wherein the moving path of the trailer corresponds to a last section in a process in which the trailer is parked, or corresponds to a first section in a process in which the trailer is taken out of the parking space.

7. A parking system comprising:

a memory and a plurality of processors, wherein at least one of the processors is configured to:

search a moving path of a trailer, give a movement instruction to a vehicle, when the trailer approaches the moving path recorded in a non-volatile memory, measure a current location of the trailer and a current direction of the trailer according to the movement instruction, compare a desired location of the trailer and a desired direction of the trailer in the moving path of the trailer with one or both of the current location of the trailer and the current direction of the trailer, and move the trailer to a parking space by minimizing a difference between the desired location of the trailer in the moving path of the trailer and the current location of the trailer and a difference between the desired direction of the trailer in the moving path of the trailer and the current direction of the trailer, wherein the moving path of the trailer is recorded or stored based on a trailer pose calculated using a hitch angle between the vehicle and the trailer, a location of the vehicle, and a direction of the vehicle while the trailer is parked or while the trailer is taken out of the parking space, wherein the moving path of the trailer comprises a new location of the trailer, based on a distance between an initial location of the trailer and the current location of the trailer exceeding a first threshold, wherein the initial location of the trailer is set to another location, based on a location record count of the trailer and a direction record count of the trailer exceeding a second threshold.

8. The parking system of claim 7, wherein the at least one processor is configured to search the moving path of the trailer based on a name that is input by a driver.

9. The parking system of claim 7, wherein the at least one processor is configured to measure the current location of the trailer and the current direction of the trailer based on a location of the vehicle, a direction of the vehicle, and an angle of a hitch.

10. The parking system of claim 7, wherein the moving path of the trailer comprises a new direction of the trailer, based on a direction between an initial direction of the trailer and the current direction of the trailer exceeding a third threshold.

11. The parking system of claim 10, wherein the initial direction of the trailer is set to another direction, based on a location and direction record count of the trailer exceeding a fourth threshold.

12. The parking system of claim 7, wherein the moving path of the trailer corresponds to a last section in a process in which the trailer is parked, or corresponds to a first section in a process in which the trailer is taken out of the parking space.

* * * * *